United States Patent [19]

Stapleton

[11] Patent Number: 4,613,274

[45] Date of Patent: Sep. 23, 1986

[54] SELF-LOADING DUMP TRUCK

[76] Inventor: Bruce E. Stapleton, Route 2, Box 191, Mulberry, Ark. 72947

[21] Appl. No.: 703,674

[22] Filed: Feb. 20, 1985

[51] Int. Cl.⁴ .............................................. B60P 1/48
[52] U.S. Cl. ................................ 414/473; 298/22 D; 414/486; 414/542
[58] Field of Search ............... 414/469, 473, 486, 487, 414/491, 495, 496, 541, 542; 298/19 R, 22 R, 22 D

[56] References Cited

U.S. PATENT DOCUMENTS

| | | | |
|---|---|---|---|
| 1,378,631 | 5/1921 | Stone | 414/473 |
| 1,464,131 | 8/1923 | Goodger | 414/542 |
| 2,576,001 | 11/1951 | Daniels | 414/487 |
| 2,750,056 | 6/1956 | Dow | 414/473 |
| 3,905,493 | 9/1975 | Logue | 414/541 |
| 4,265,585 | 5/1981 | Hawkins | 414/541 |
| 4,383,791 | 5/1983 | King | 414/542 |
| 4,516,903 | 5/1985 | Hill | 414/491 |

FOREIGN PATENT DOCUMENTS 915677  7/1949  Fed. Rep. of Germany ...... 414/486

Primary Examiner—Robert J. Spar
Assistant Examiner—David A. Bucci
Attorney, Agent, or Firm—Harold H. Dutton, Jr.

[57] ABSTRACT

A self-loading dump body truck comprising a vehicle having a frame, first and second cross members mounted on the frame, the first cross member being positioned near the rear of the vehicle and the second cross member being positioned forwardly of the first cross member, a cargo box pivotally connected to the first cross member and being supported by the second cross member in a lowered positioned, and inverted U-shaped boom member pivotally connected to the first cross member, the cargo box and the boom member having a common pivot axis, a hydraulic cylinder for pivoting the boom member with respect to the frame, a slide connected to the boom member and slidably engaging the cargo box for movement with respect to the cargo box as the boom member is pivoted, and a connecting arrangement for selectively connecting the slide to the cargo box for pivoting the cargo box as the boom member is pivoted.

18 Claims, 8 Drawing Figures

SELF-LOADING DUMP TRUCK

This invention relates to a self-loading dump body truck. More particularly, the invention relates to a device for loading objects into the body of a dump truck so that large and/or heavy objects may be readily loaded onto or unloaded from a dump body truck.

BACKGROUND AND OBJECTS

In the past, many devices have been proposed as attachments for trucks to assist the operator in loading or unloading cargo from the bed or body of the truck. For example, lift gates are often used to raise heavy or bulky objects up to the level of a truck bed so that the objects may be easily moved into the bed of the truck.

Such lift gates usually comprise a platform which is pivotally secured to a hydraulic mechanism and pivoted upwardly to a vertical position when not in use, so that the platform is pivoted through an arc of about 90° to a horizontal position, and the hydraulic system is actuated to lower the platform to the ground. Then, the cargo is loaded onto the platform, and actuation of the hydraulic system raises the platform, while maintaining a horizontal attitude, until it is substantially the same height as the bed of the truck, at which time the cargo is moved into the bed of the truck.

Another type of loading attachment for a truck utilizes an inverted U-shaped boom, the legs of which are attached to the bed of a pickup truck. The cross-bar of the boom carries a winch which is used to lift a load. In the stored position, the crossbar of the boom is positioned immediately behind the cab of the truck, but when pivoted, the crossbar is extended rearwardly beyond the rear of the truck. A load may be engaged by a cable on the winch, and lifted by the winch. Then, by pivoting the crossbar toward the front of the truck, the load is moved forwardly over the bed of the truck, and then lowered into the bed.

This latter type of loading mechanism is shown in U.S. Pat. Nos. 4,383,791 to Louis J. King and 4,265,585 to Wallace H. Hawkins. Both of these devices are inteded for attachment to a pickup truck, the King device being secured to the rear of the bed, and the Hawkins device being secured to the top of the sides of the bed.

Another similar device is shown in U.S. Pat. No. 2,750,056 to R. A. Dow, this device being used with a dump body truck.

One of the difficulties associated with these prior devices has been that they are not as rugged as often required for use with large or heavy loads. Since the U-shaped boom must of necessity be open between the side legs to enable the load to "pass through" the boom, there cannot be any diagonal bracing as might otherwise be used to strengthen the boom. Thus, all forces are transmitted to the pivot points of attachment.

Hawkins attempts to strengthen his device by securing the legs to channel members which in turn are secured to the top of the side rails of the bed, and King attempts to provide a secure mounting by using heavy bolsters mounted in the bed of the truck. However, the nature of the Hawkins device is such that when not in use, the boom is elevated slightly above the cab of the truck such that it would often be in the way, and the mounting arrangement of King significantly reduces the width of the bed available for use.

Thus, these prior devices, while being advances in the art, still possess some disadvantages which hamper their common use.

Accordingly, a primary object of this invention is to provide a self-loading attachment for a truck which overcomes the disadvantages of the prior art devices.

Another object of this invention is to provide a self-loading attachment for a truck which is ruggedly secured to the frame of the vehicle.

A further object of this invention is to provide a self-loading dump-body truck which does not interfere with the normal operation of the dump body.

Yet another object of the invention is to provide a self-loading attachment for a truck which is ruggedly secured to the frame of the vehicle.

Still another object of the invention is to provide a self-loading attachment for a dump truck in which common hydraulic cylinders are used for operating both the loading attachment and for operating the dump bed.

Yet a further object of the invention is to provide a self-loading attachment for a dump truck which is capable of simple, one-man operation.

Still a further object of this invention is to provide a self-loading dump truck having a loading boom operated by the same hydraulic cylinders as the dumping bed, with a novel release mechanism enabling separate or combined operation.

DESCRIPTION OF THE DRAWINGS

These and other objects and advantages of this invention will become apparent from the following further description of the invention and the accompanying claims, when taken together with the accompanying drawings, in which:

FIG. 5 is an enlarged plan view of the locking mechanism of the attachment, with portions broken away for clarity;

FIG. 6 is a section view along lines 6—6 of FIG. 5 and viewed in the direction of the arrows;

BRIEF DESCRIPTION OF THE INVENTION

Figure 1:
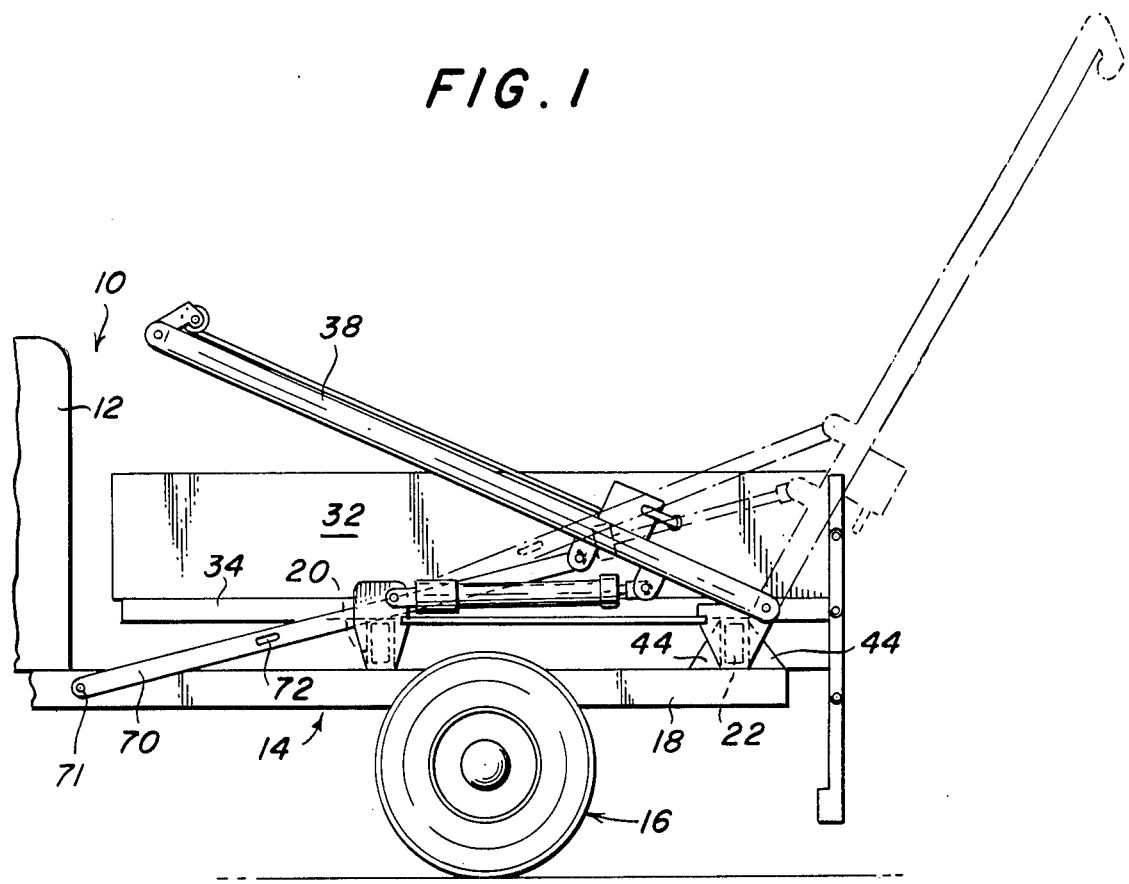
FIG. 1 is a fragmentary side elevation view of a truck chassis showing the invention mounted thereon.

The present invention comprises a mounting frame having two transverse box frame members which are welded to the frame rails of the truck chassis. The forward one of these frame members has bolsters secured to its outer ends and one end of each of two hydraulic cylinders is pivotally secured to these bolsters.

The rear box frame member is provided with two outer bolsters at the ends of the member and two inner bolsters positioned laterally between the frame rails of the chassis and the outer bolsters. Each of these four bolsters has a pivot thereon, and the pivots are all aligned on a common pivot axis which is transverse to the longitudinal axis of the truck frame.

An inverted U-shaped boom has its legs pivotally secured to the outer rear bolsters, and the two hydraulic cylinders are pivotally connected at their other ends to the legs of the boom, between the front and rear frame members, so that the boom may be moved pivotally about the pivot axis from a stored position in which the boom extends toward the cab of the truck to a rear, loading position in which the boom may be used for loading cargo. The cross-member of the boom carries thereon a winch which may be manually operated, or alternatively may be hydraulic or electric.

Positioned between the legs of the boom is a load body which is pivotally attached to the rear, inner bolsters. The load body is a rectangular cargo box of appropriate length and depth, and of a width such as to rest between the side legs of the boom.

Secured to each side of the load body is a locking box having a journal machined therein, and a locking pin extends transversely outwardly into the locking box. A locking rod passes longitudinally through the journal, and has its rearward end pivotally connected to the side leg of the boom. In this manner, when the hydraulic cylinders are actuated and extended, the boom is raised toward its rear position for the loading operation. Reversing the direction of the hydraulic cylinders by suitable hydraulic valving retracts the cylinders and returns the boom to its stored position.

During this operation of moving the boom, the locking rods slide freely through the journal in the locking box. When it is desired to actuate the dumping mechanism, a trip rod is actuated, followed by operation of the hydraulic system to extend the cylinders. Actuation of the trip rod releases the spring biased locking pins in the lock box, so that the locking rods begin to travel through the journal in the lock box, until the locking pins enter locking holes in the locking rods. At this time, the locking pins snap into the locking holes, and further extension of the hydraulic cylinders will raise the boom as well as the load bed, to a dumping position.

Since the boom and the bed pivot about the same pivot axis, no complicated linkage mechanism is needed to carry out the pivotal movement of the bed and the boom together. Furthermore, since the boom and the bed are pivoted by means of the same hydraulic cylinders, the hydraulic system is greatly simplified, thus reducing the cost of the attachment.

The invention will now be described in greater detail with reference to the attached drawings.

DESCRIPTION OF THE PREFERRED EMBODIMENTS

Figure 2:
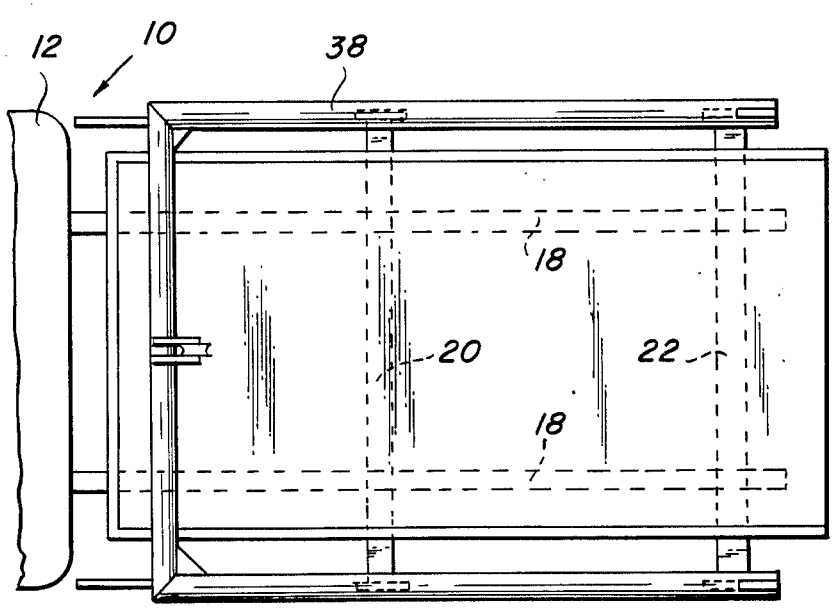
FIG. 2 is a top plan view of the device shown in FIG. 1.
Figure 3:
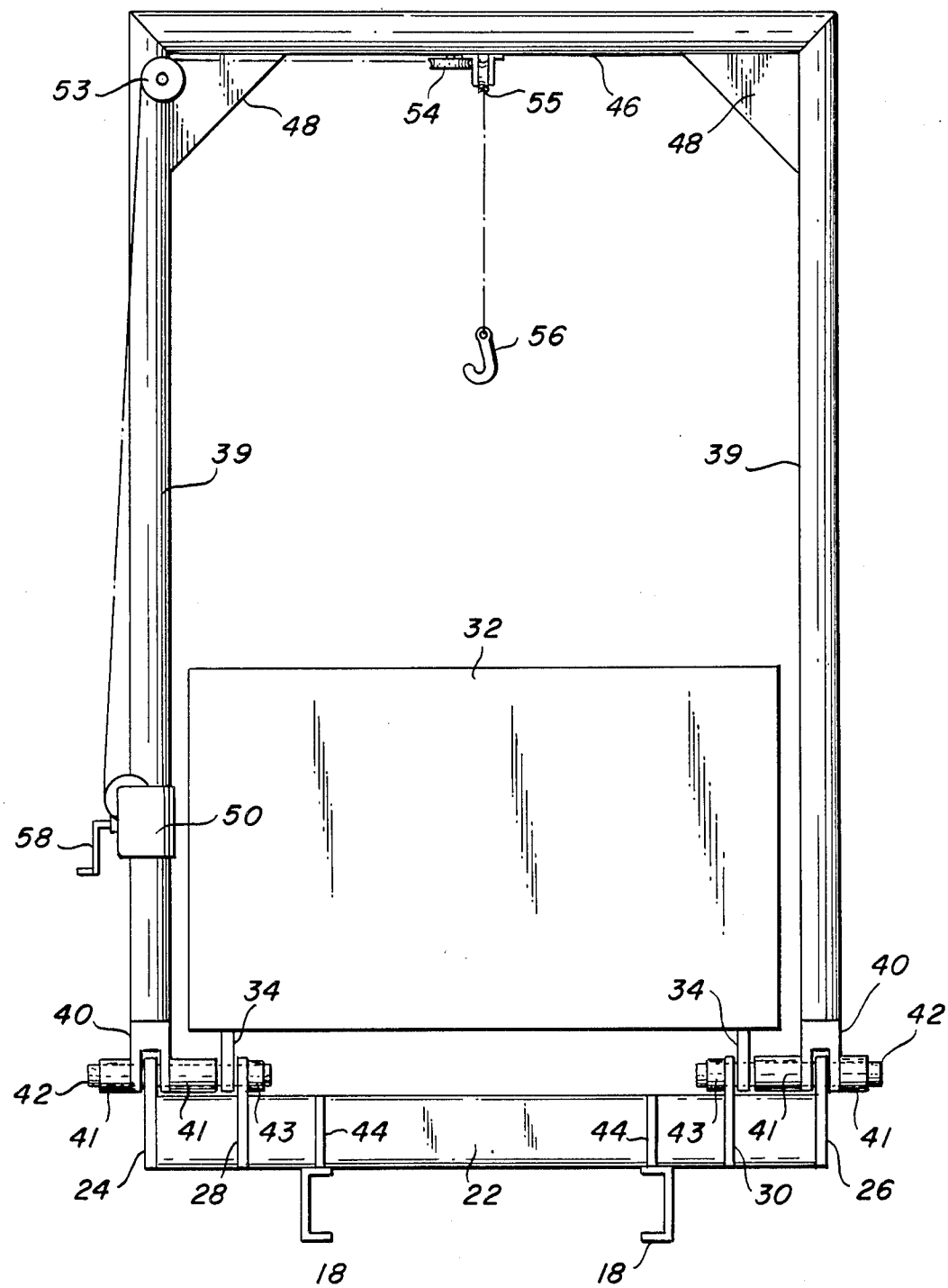
FIG. 3 is a view from the right side of FIG. 1, i.e. from the rear of the truck.

Referring first to FIGS. 1, 2 and 3, a truck generally designated 10 is seen to include a conventional cab 12 mounted on a frame 14 with wheels 16, all of which is commonly referred to as a cab and chassis type of truck. Such trucks are readily available for mounting a variety of bodies thereon.

The truck frame 14 includes a pair of frame rails 18 which extend longitudinally of the truck body. Mounted on these frame rails 18 are front and rear body frame members 20 and 22, respectively. These body frame members 20 and 22 are preferably steel members of box construction, and are welded or otherwise secured to the frame rails 18.

As seen in FIG. 3, a pair of outer bolsters 24 and 26 are welded to the rear cross member 22 at the outer ends of the member 22, and a pair of inner bolsters 28 and 30 are welded to the rear cross member 22 intermediate the outer bolster and the frame rails 18. Each of the bolsters 24, 26, 28 and 30 include a portion which extends vertically slightly above the top of the cross member 22, and a plurality of pivot points are formed in these upper extensions of the bolsters, so that the pivots are positioned above the frame member 22. The pivots are provided by means of holes in the bolsters, with collars welded on either side of the bolster for added strength and rigidity, if desired.

A cargo box 32 is mounted on its own frame rails 34, and at the rear, the frame rails 34 have holes passing therethrough for receiving a pivot pin passing therethrough, as well as passing between the inner and outer bolsters on each side of the chassis. The front of the cargo box simply rests on the front cross member 20 when in the lowered position.

An inverted U-shaped boom member 38 is provided on the ends of its legs 39 with bifurcated trunnions 40, such that the two furcations on each trunnion straddle the outer bolsters as seen in FIG. 3. Tubular collars 41 are welded on the outer side of each of the furcations, and a further collar 43 is welded on the inside of bolster 28. Pivot pins 42 pass through the collars 41 and 43, and through the bolsters 24, 26, 28 and 30. The two pivot pins 42 on either side of the chassis are coaxially positioned, and in this manner, the pivot axis of the cargo box 32 and the pivot axis of the boom member 38 are the same.

To further strengthen the mounting of the attachment to the frame of the vehicle, gusset plates 44 may be welded between the cross member 22 and the frame rails 18.

The boom member 38 is seen to include in addition to its legs 39, a cross piece 46 and reinforcing gussets 48 in the upper corners. A winch 50 is mounted on one of the legs 39, and a cable 52 passes around pulleys 53, 54 and 55, and the cable is provided with a hook 56, or other load engaging member. The pulleys 54 and 55 are mounted on perpendicular, offset axes, such that the cable in passing around both pulleys changes directions as shown in FIG. 3. By operating the handle 58 of the winch 50, the hook, and thus a load engaged thereby, may be raised and lowered as needed.

This manual winch 50 as shown, may be replaced by a hydraulic winch or even an electric winch, depending upon the needs of the user and the available power from the vehicle.

Figure 4:
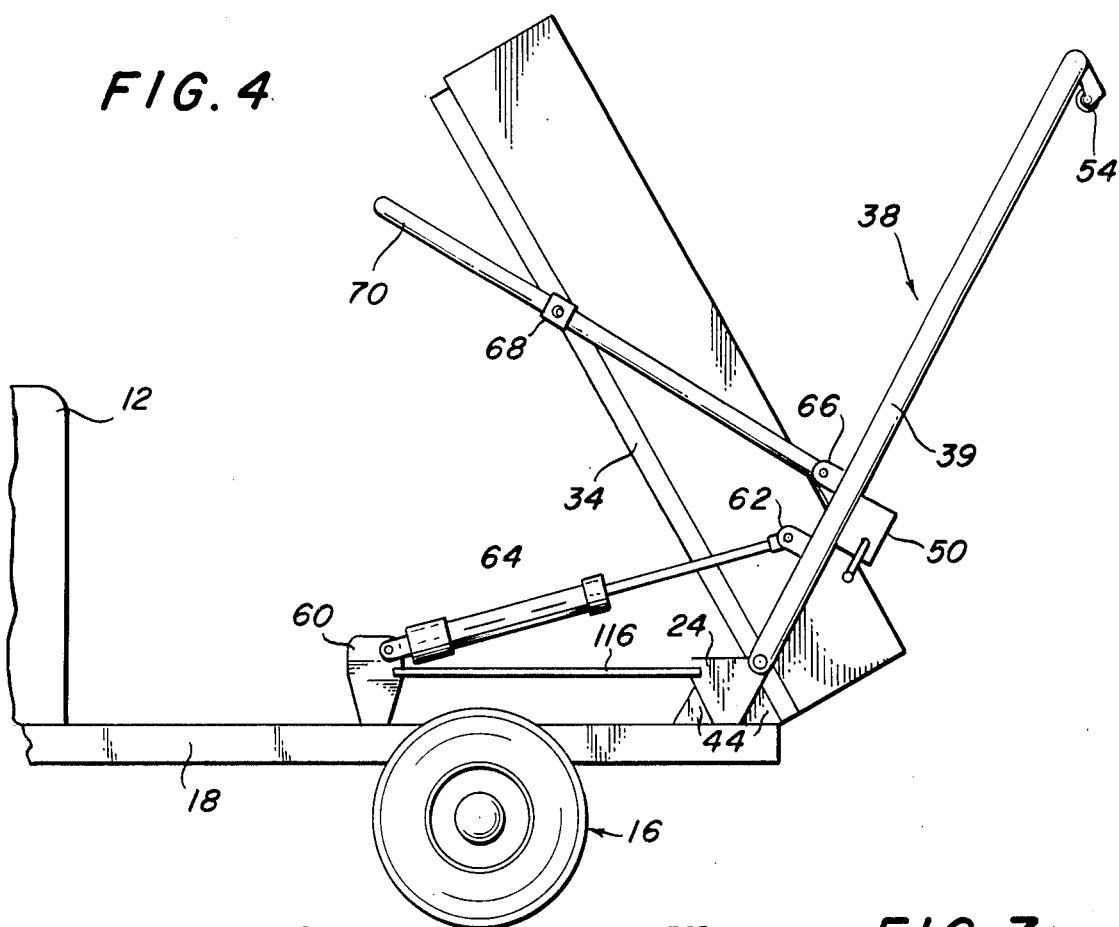
FIG. 4 is a view similar to FIG. 1, but with the dump body in the raised position.
Figure 7:
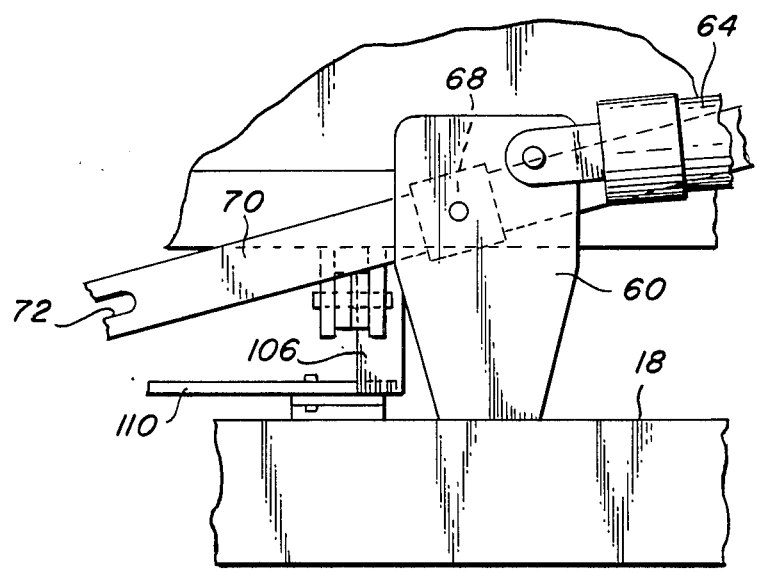
FIG. 7 is an enlarged plan view of a portion of the lock box mounting of the invention.
Figure 8:
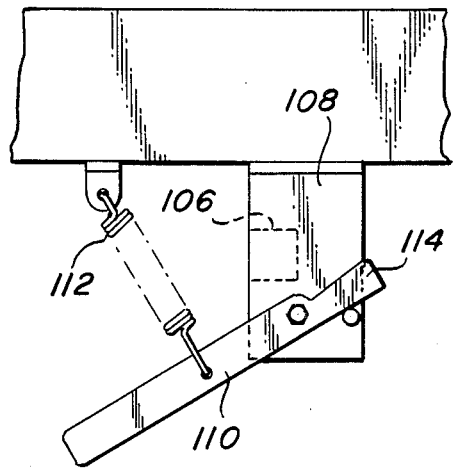
FIG. 8 is an enlarged view of the locking release mechanism.

Referring now to FIGS. 1 and 4, it will be seen that the front cross member 20 is also provided with a bolster 60 at each end thereof. In addition, the legs 39 of the boom 38 are provided with pivot lugs 62. A double acting hydraulic cylinder 64 is pivotally connected both at the bolster 60 and the lug 62. Suitable hydraulic pump and hydraulic line connections (not shown) are made in a conventional manner, with the pump being suitable mounted on the vehicle frame and driven by the crankshaft of the vehicle engine.

By this construction, it will be seen that extension or retraction of the hydraulic cylinders 64 will result in a pivotal movement of the boom 38 between the solid line and the dotted line positions shown in FIG. 1, carrying with it the winch 50 and the cable and hook, and of course any load supported by the cable and hook.

An additional lug 66 is mounted forward of the lug 62 on each side of the boom 38. Further, a locking box 68 is mounted on each side of the cargo box frame 34. These locking boxes 68 are pivotally secured to the frame. Internally, the locking boxes are provided with slide journals, so that locking rods 70, which are pivotally connected to the lugs 66 are free to slide through the slide journals, and to permit the varying angle, the locking boxes 68 pivot on their mounting. A stop pin 71 is positioned transversely in the forward end of the rods 70 to prevent accidental disengagement of the rods 70 from the lock boxes 68. Further, the locking rods 70 may be provided with an offset end portion (not shown) at their pivot end if necessary to provide clearance around the hydraulic cylinders 64.

In this manner, with the cargo box in its lowered position as seen in FIG. 1, the boom 38 may be moved between the positions shown in FIG. 1. The locking rods 70 are provided with holes or slots 72 which will pass through the locking boxes 68 as the boom 38 is raised or lowered. By means of the mechanism shown best in FIGS. 5 and 6, locking pins may be inserted into the apertures 72 in the locking rods 70, and in this manner, as the boom 38 is raised by the extension of the hydraulic cylinders 64, the locking rods 70 which are then securely connected to the locking boxes 68 will cause the cargo box 32 to pivot about the pivot pins 42.

Figures 5, 6:
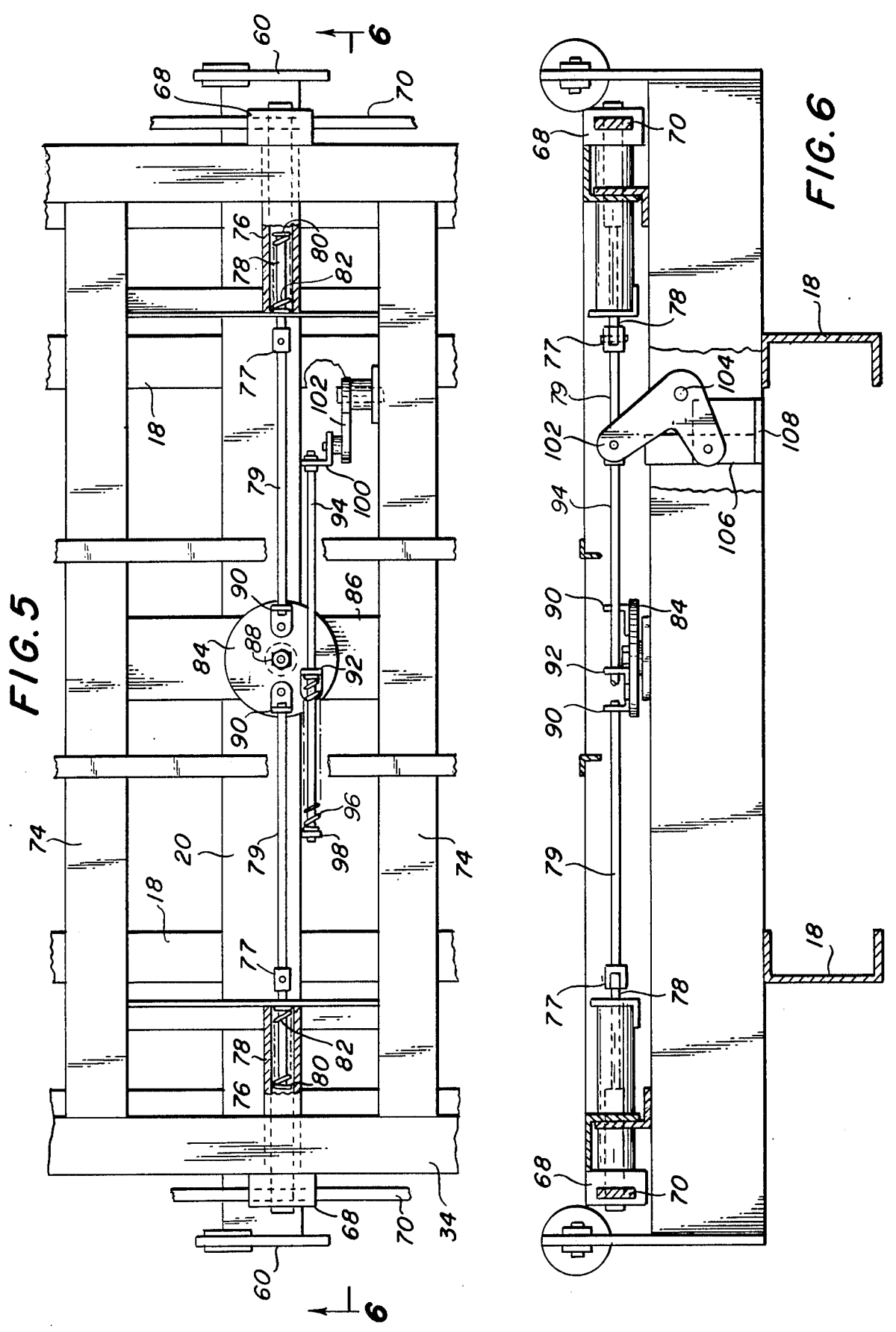

Referring to FIGS. 5 and 6, which is fragmentary in nature and has parts broken away for clarity, the cargo box 32 has, in addition to side frame members 34, a plurality of cross members 74. The locking boxes 68 include housing portions 76 which extend inwardly of the side members 34, and pivot with the locking boxes 68 as described previously. Inside of the housings 76 are mounted locking pins 78. These pins 78 are provided with pivotable couplings 77 connecting the pins 78 to rods 79. The locking pins 78 are also provided with flanges 80 and compression springs 82 which surround the locking pins 78.

These rods 79 are connected at their inboard ends to a disk 84, which in turn is rotatably secured to a frame member 86 by means of a pivot bolt 88. The two rods 79 are secured at diametrically opposed points on the disk 84 to lugs 90 which are pivotally mounted on the disk 84. An additional lug 92 is also pivotally mounted on disk 84, and through it passes a trip rod 94. A further compression spring 96 surrounds rod 94 and bears against the lug 92 and a flange 98 mounted on the rod 94. For reasons which will be explained shortly, the spring 96 should have more power than the combined power of the two springs 82.

The rod 94 is connected at its other end to an angle clip 100 which in turn is pivotally attached to one leg of a bell crank 102 which is pivotally mounted at 104 to one of the cross members 74. The other leg of the bell crank 102 has a trip arm 106 attached thereto. The arm 106 is positioned such that when the cargo box is in its lowered position and resting upon the cross member 20, the arm 106 is resting upon a pad 108 secured to the frame rail 18. A release handle 110 is pivotally mounted on the frame rails 18 and biased by means of a spring 112, and includes an appropriately notched end portion 114 for engaging the arm 106 and securing it in the position in which the locking pins 78 are retracted.

The operation of this latching mechanism will now be described. With the cargo box 32 in the lowered, at rest, position, the release handle is actuated, the bell crank 102 is rotated. However, in the lowermost position of the cargo box and the locking rods 70, the apertures 72 are not aligned with the locking pins 78. Thus, these locking pins 78 simply press against the side of the locking rods 70. As the boom 38 is raised, drawing the rods 70 through the locking boxes 68, the apertures 72 will come into alignment with the locking pins 78, and due to the urging of the springs, the locking pins 78 will snap into the apretures 72. Further extension of the hydraulic cylinders will then raise the cargo box 32 to a dumping position.

When the box 32 and boom 38 are lowered, the arm 106 will contact the pad 108 and the bell crank 102 will rotate clockwise as seen in FIG. 6. However, due to the friction between the locking pins 78 and the locking rods 70, the pins will remain engaged in the apertures 72 until the cargo box 32 is lowered completely and pressure released from the locking pins 78. At this point, the compression spring 96 which was compressed when the bell crank was rotated will overcome the power of the springs 80, and cause retraction of the locking pins 78, which in turn are retained in the retracted position by the handle 110 until the cycle is repeated.

The delay in the release of the locking pins 78 from the apertures 72 relieves the friction on the ends of the locking pins 78. Further, since the locking pins 78 do not engage the apertures 72 until the rods 70 have travelled through the boxes 68, the boom is at a partially raised position when the dumping action begins, i.e. a position at which the cylinders 64 are at the most efficient angle with respect to the boom 38, thus minimizing the hydraulic force necessary to begin raising the cargo box to the dumping position.

This feature enhances the lifting capacity of the hydraulic cylinders by directing the force vectors in the most useable manner and reducing stress on the apparatus.

When the boom 38 and the cargo box 32 are lowered to the point that the box is resting on the frame member 20 and the locking pins 78 are retracted, further lowering of the cylinders 64 will lower the boom 38 to its lowermost, fully retracted position shown in solid line position in FIG. 1.

In some cases, for greater strength, it is desireable to provide a further connection between the bolsters 24 and 60 in the form of a rod 116 which can withstand tension created as the hydraulic cylinder begins to extend. The tension diminishes, however, as the boom 38 reaches a greater angle.

The self-loading attachment described can be used on any size truck chassis with appropriate size modifications, and can be used to lift and/or load such widely diverse objects as hay bales, telephone poles, machinery, tanks, and the like, with ease by a single operator.

While this invention has been described as having certain preferred embodiments and features, it will be understood that it is capable of still further variation and modification without departing from the scope of the invention. Accordingly, this application is intended to cover all variations, modifications and adaptations of the invention as may fall within the spirit and the scope of the appended claims.

What I claim is:

1. A self-loading dump body truck comprising a vehicle having a frame, first and second cross members mounted on said frame, said first cross member being positioned near the rear of said vehicle and said second cross member being positioned forwardly of said first cross member, a cargo box pivotally connected to said first cross member and being supported by said second cross member in a lowered position, an inverted U-shaped boom member pivotally connected to said first cross member, said cargo box and said boom member having a common pivot axis, hydraulic cylinder means for pivoting said boom member with respect to said frame, slide means including a locking box connected to said cargo box and a locking rod connected to said boom member and sliding through said locking box for movement with respect to said cargo box as said boom member is pivoted, and means for selectively connecting said slide means to said locking box for selectively pivoting said cargo box as said boom member is pivoted.

2. A self-loading dump body truck as in claim 1 and wherein said said first cross member includes first bolsters at each end thereof providing pivot points for said boom member, and second bolsters inboard of said first bolsters providing pivot points for said cargo box.

3. A self-loading dump body truck as in claim 2 and including a pivot pin on each side of said vehicle and engaging a first and a second bolster, said boom member and said cargo box on each side of said vehicle.

4. A self-loading dump body truck as in claim 3 and wherein said boom member includes lifting means for cargo.

5. A self-loading dump body truck as in claim 3 and including stiffening gussets connecting said first cross member and said vehicle frame.

6. A self-loading dump body truck as in claim 1 and wherein said locking box is pivotally connected to said cargo box, said locking rod is pivotally connected to said boom member, and said selective connecting means comprises locking pin means passing through said locking box for securing and releasing said locking rod with respect to said locking box.

7. A self-loading dump body truck as in claim 6 and wherein said locking rod includes an aperture engagable by said locking pin, said aperture being positioned such that upon actuation of said hydraulic cylinder means, said boom member commences movement before said locking pin engages the aperture in said locking rod.

8. A self-loading dump body truck as in claim 7 and including means for automatically retracting said locking pin from engagement in the aperture when said cargo box contacts said second cross member and before said boom member is fully lowered.

9. A self-loading dump body truck as in claim 8 and including a disk member rotatably mounted on the underside of said cargo box, means connecting said locking pins to said disk member so that upon rotation of said disk member, said locking pins are retracted from engagement with said locking rods.

10. A self-loading dump body truck as in claim 9 and including spring means normally urging said locking pins into engagement with said locking rods, bell crank means for causing rotation of said disk member, and a trip arm for engaging said vehicle frame for causing rotation of said bell crank and said disk member when said cargo box is lowered.

11. A self-loading dump body truck as in claim 10 and including means for retaining said locking pins in a retracted position.

12. A self-loading dump body truck as in claim 10 and including means for releasing said retaining means.

13. A self-loading dump body truck as in claim 10 and including lost motion means between said bell crank and said disk member such that said bell crank is rotated upon lowering of said cargo box before said disk member is rotated.

14. A self-loading dump body truck as in claim 13 and wherein said lost motion means comprises a spring connection.

15. A self-loading dump body truck comprising a vehicle having a frame, means defining a pivot axis transverse to said vehicle at the rear of said frame, an inverted U-shaped boom member mounted on said vehicle for pivotal movement about said pivot axis, a cargo box mounted on said vehicle for pivotal dumping movement about said pivot axis, hydraulic means for pivoting said boom member so as to cause said boom member to pivot between a first, stored position in which said boom member extends generally toward the front of said vehicle and a second position extending rearwardly of said vehicle, and means selectively connecting said boom member and said cargo box and including a locking box connected to said cargo box and a locking rod sliding through said locking box for movement relative to said cargo box as said boom member is pivoted, and means for selectively connecting said locking rod to said locking box, whereby as said boom member is pivoted from said first position to said second position, said cargo box is pivoted about said pivot axis to a dumping position when said selective connecting means is engaged.

16. A self-loading dump body truck as in claim 15 and wherein said connecting means includes means for automatically disconnecting said boom member and said cargo box when said cargo box is lowered.

17. A self-loading dump body truck as in claim 16 and wherein said connecting means includes a release member for causing said connection when said boom is pivoted toward said second position.

18. A self-loading dump body truck as in claim 17 and wherein said automatic disconnecting means includes a lost motion connection for disconnecting said connecting means before said boom member reaches said first position.

* * * * *